(12) United States Patent
Chapman et al.

(10) Patent No.: US 11,766,745 B2
(45) Date of Patent: Sep. 26, 2023

(54) SYSTEM AND METHOD OF DETERMINING SUPPORT LOCATIONS FOR ADDITIVELY MANUFACTURED BUILD PARTS

(71) Applicant: THE BOEING COMPANY, Chicago, IL (US)

(72) Inventors: Eric M. Chapman, Bonney Law, WA (US); Dana A. Henshaw, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 454 days.

(21) Appl. No.: 16/853,959

(22) Filed: Apr. 21, 2020

(65) Prior Publication Data

US 2021/0323089 A1    Oct. 21, 2021

(51) Int. Cl.
*B23K 26/342* (2014.01)
*B33Y 10/00* (2015.01)
(Continued)

(52) U.S. Cl.
CPC .......... *B23K 26/342* (2015.10); *B23K 26/043* (2013.01); *B23K 26/082* (2015.10);
(Continued)

(58) Field of Classification Search
CPC .. B23K 26/342; B23K 26/043; B23K 26/082; B23K 26/0884; B23K 26/10;
(Continued)

(56) References Cited

U.S. PATENT DOCUMENTS

2016/0306901 A1* 10/2016 Ainsworth ............. G06F 30/00
2017/0282246 A1   10/2017 Liebl et al.
(Continued)

FOREIGN PATENT DOCUMENTS

EP    3736108 A1 * 11/2020
EP    3782802 A1 *  2/2021 ........... B29C 64/386

OTHER PUBLICATIONS

Whitman College, 6.1 Optimization, 2013, https://www.whitman.edu/mathematics/calculus_online/section06.01.html (Year: 2013).*
(Continued)

*Primary Examiner* — Dana Ross
*Assistant Examiner* — Bryan M Badalamenti
(74) *Attorney, Agent, or Firm* — THE SMALL PATENT LAW GROUP LLC; Philip S. Hof

(57) ABSTRACT

An additive manufacturing system includes one or more processors configured to determine one or more geometrical characteristics of each of multiple segments of a build part at a candidate position of the build part relative to an additive manufacturing instrument. The one or more geometrical characteristics include an angle of incidence between a beam line extending from an electromagnetic energy source of the additive manufacturing instrument and a surface normal of a respective skin of the corresponding segment proximate to the beam line. The one or more processors are configured to determine, based on one or more geometrical characteristics of the segments at the candidate position, one or more locations of support material to be formed adjacent the build part during a build process of the build part.

20 Claims, 5 Drawing Sheets

(51) Int. Cl.
  *B33Y 30/00* (2015.01)
  *B33Y 50/02* (2015.01)
  *B23K 26/082* (2014.01)
  *B23K 26/70* (2014.01)
  *B23K 26/04* (2014.01)
  *B23K 26/08* (2014.01)
  *B23K 26/10* (2006.01)

(52) U.S. Cl.
  CPC .......... *B23K 26/0884* (2013.01); *B23K 26/10* (2013.01); *B23K 26/702* (2015.10); *B33Y 10/00* (2014.12); *B33Y 30/00* (2014.12); *B33Y 50/02* (2014.12)

(58) Field of Classification Search
  CPC ...... B23K 26/702; B33Y 10/00; B33Y 30/00; B33Y 50/02; B33Y 50/00; G05B 2219/49038; G05B 2219/49039; G05B 2219/49041; G05B 19/4099; Y02P 10/25; B29C 64/153; B29C 64/40; B29C 64/268; B29C 64/393; B22F 10/40; B22F 10/80; B22F 10/28
  See application file for complete search history.

(56) References Cited

U.S. PATENT DOCUMENTS

2019/0358736 A1  11/2019  Levine et al.
2020/0139631 A1*  5/2020  Buller ................... B29C 64/393
2021/0114111 A1*  4/2021  Schade ................. B33Y 10/00

OTHER PUBLICATIONS

Zhuoer Chen, Surface roughness and fatigue properties of selective laser melted Ti—6Al—4V alloy, 2019, Elsevier, Additive Manufacturing for the Aerospace Industry, DOI: https://doi.org/10.1016/B978-0-12-814062-8.00015-7, pp. 283-299 (Year: 2019).*

Wang et al., "Research on the fabricating quality optimization of the overhanging surface in SLM process", Int J Adv Manuf Technol (2013) 65:1471-1484 (14 pages).

Extended European Search Report received for related European Patent Application No. 21156316.8 dated Jul. 13, 2021 (12 pages).

Kleszczynski et al. "Position Dependency of Surface Roughness in Parts from Laser Beam Melting Systems" 26th International Solid Free Form Fabrication (SFF) Symposium; 2015 (11 pages).

* cited by examiner

SYSTEM AND METHOD OF DETERMINING SUPPORT LOCATIONS FOR ADDITIVELY MANUFACTURED BUILD PARTS

FIELD OF THE DISCLOSURE

Embodiments of the present disclosure generally relate to additive manufacturing of three-dimensional build parts.

BACKGROUND

Additive manufacturing refers to any process for manufacturing a three-dimensional build part in which successive layers of base material are deposited under computerized control. The deposited layers are selectively fused via the application of a focused energy source, such as a laser, which heats and bonds the material. The size and shape of the build part can be based on a three-dimensional computer model or another electronic data source. Additive manufacturing can be used to fabricate objects that have complex structures and shapes. Additive manufacturing techniques for fabricating metal build parts can allow greater design freedom and yield more precise and repeatable finished products than conventional metal manufacturing techniques, such as die-casting, extruding, and the like.

A known challenge with additively-manufacturing build parts that include internal voids and/or protruding appendages is providing sufficient mechanical support for overhanging features of the structure during the build process. For example, overhanging features of semi-complete cavities and/or appendages may not properly adhere to an adjacent layer of material and/or may deform due to the force of gravity. Furthermore, temperature gradients and phase changes as the fused layers cool down cause internal stresses within the build part, particularly with metal parts. The internal stresses can thermally contract and/or distort the structure causing irregularities that deviate from the intended shape in the build plan. Overhanging features are typically supported and secured in place during the additive manufacturing build process by additively constructing external supports, such as block supports, tension support rods, and the like, during the build process. The supports may dissipate heat from the overhanging features, structurally support the construction of the overhanging features, and/or provide tension to restrict warping and maintain the structural shape of the overhanging features.

The supports are not part of the finished product and therefore must be removed from the build part during post-processing after the additive manufacturing stage. The removal of the supports may be costly, difficult, time intensive, and/or labor intensive. For example, the supports may need to be cut and grinded away from the surfaces of the build part, which can be especially difficult to do in certain hard-to-reach areas such as internal cavities. The task of removing the supports during post-processing reduces manufacturing efficiency and increases production costs. Furthermore, residual metal from the supports left intact on the build part may degrade the quality of the finished product.

SUMMARY OF THE DISCLOSURE

In one or more embodiments, an additive manufacturing system is provided. The additive manufacturing system includes one or more processors configured to determine one or more geometrical characteristics of each of multiple segments of a build part at a candidate position of the build part relative to an additive manufacturing instrument. The one or more geometrical characteristics include an angle of incidence between a beam line extending from an electromagnetic energy source of the additive manufacturing instrument and a surface normal of a respective skin of the corresponding segment proximate to the beam line. The one or more processors are configured to determine, based on one or more geometrical characteristics of the segments at the candidate position, one or more locations of support material to be formed adjacent the build part during a build process of the build part.

In one or more embodiments, a method is provided for determining part support locations for an additively manufactured build part. The method includes determining one or more geometrical characteristics of each of multiple segments of a build part at a candidate position of the build part relative to an additive manufacturing instrument. The one or more geometrical characteristics include an angle of incidence between a beam line extending from an electromagnetic energy source of the additive manufacturing instrument and a surface normal of a respective skin of the corresponding segment proximate to the beam line. The method includes determining, based on one or more geometrical characteristics of the segments at the candidate position, one or more locations of support material to be formed adjacent the build part during a build process of the build part.

In one or more embodiments, an additive manufacturing system is provided that includes a display device and one or more processors operably coupled to the display device. The one or more processors are configured to determine one or more geometrical characteristics of each of multiple segments of a build part at a candidate position of the build part relative to an additive manufacturing instrument. The one or more geometrical characteristics include an angle of incidence between a beam line extending from an electromagnetic energy source of the additive manufacturing instrument and a surface normal of a respective skin of the corresponding segment proximate to the beam line. The one or more processors are configured to determine, based on one or more geometrical characteristics of the segments at the candidate position, one or more locations of support material to be formed adjacent the build part during a build process of the build part. The one or more processors are configured to generate and display a virtual representation of the build part at the candidate position on the display device. The virtual representation includes the support material at the one or more locations that are determined.

BRIEF DESCRIPTION OF THE DRAWINGS

These and other features, aspects, and advantages of the present disclosure will become better understood when the following detailed description is read with reference to the accompanying drawings in which like numerals represent like parts throughout the drawings, wherein.

DETAILED DESCRIPTION OF THE DISCLOSURE

Figure 1:
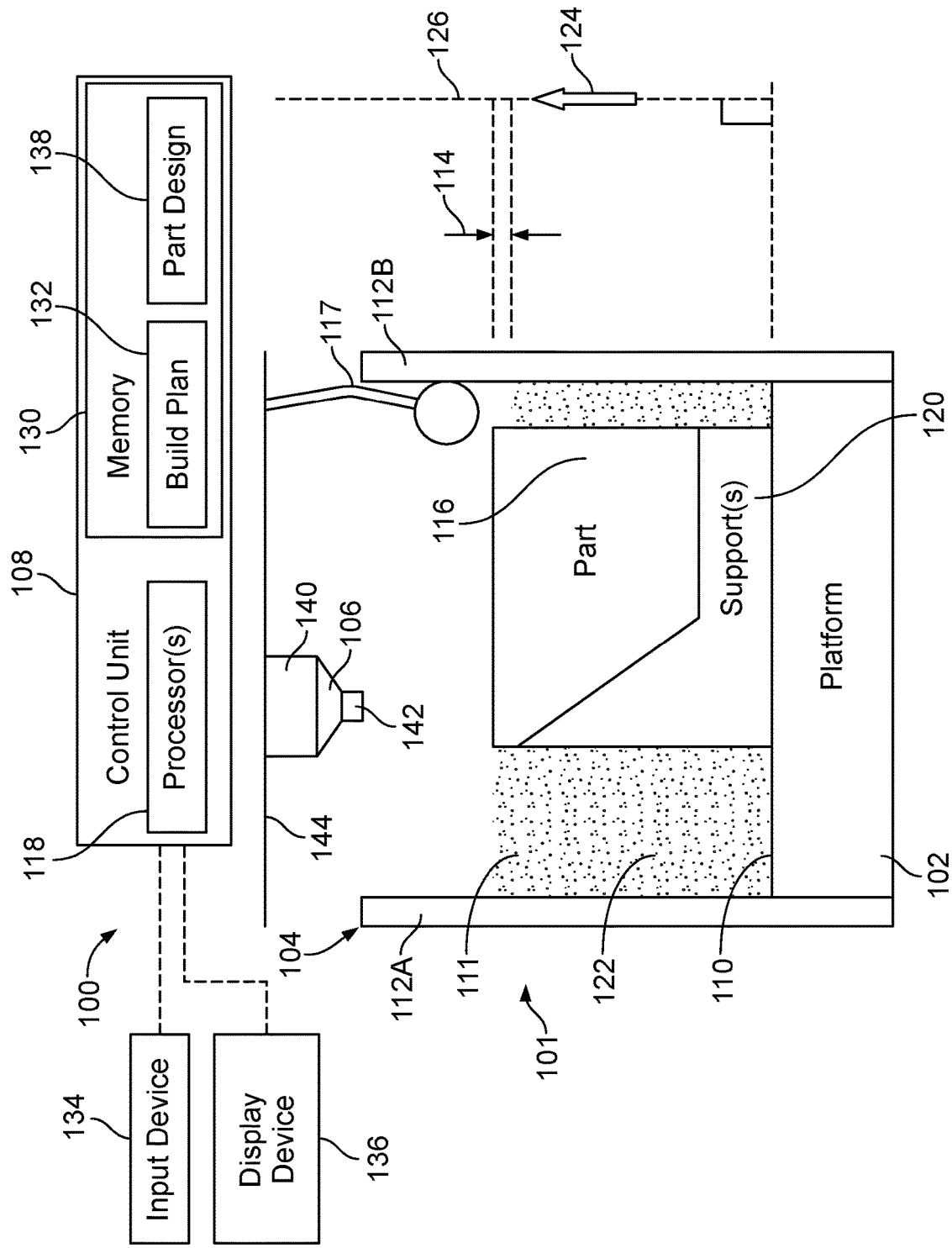
FIG. 1 is a schematic illustration of an additive manufacturing system according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

In consideration of the cost, time, and labor of extracting supports from additively manufactured build parts and performing surface treatments after the additive build process, there are several advantages in eliminating the supports, or at least reducing the amount and/or size of supports, used during the build process. For example, cost savings can be realized by excising less support material during post-processing and using less material during the additive manufacturing process. Production efficiency can be increased by reducing the duration of the printing process (due to constructing fewer supports) and the duration of post-processing (due to excising fewer supports from the build part).

Embodiments of the present disclosure provide a system and method of determining part support locations for additive manufacturing. The embodiments are designed to reduce the overall number of supports and/or amount of support material utilized to additively manufacture a given build part, relative to pre-existing part support algorithms, while satisfying designated standards related to part surface quality, near-surface quality, and geometric accuracy. The system and method described herein are configured to determine where to form supports for the build part based on geometrical characteristics of the proposed build part. For example, the geometrical characteristics account for a proposed location and orientation of various sections or segments of the build part relative to the source of focused electromagnetic energy that melts the source material to form layers of the build part. The geometrical characteristics include an angle of incidence of each segment of the build part relative to the focused energy source. By considering the positioning of the build part segments relative to the focused energy source, the system and method can precisely determine which segments of the part require supports to achieve a requisite level of quality (e.g., accuracy, consistency, surface quality, near-surface quality, and the like). The system and method may more accurately determine where support structures are necessary for an additive build process than known methods of determining support locations that do not factor in the positioning and orientation relative to the energy source. As a result of the increased determination accuracy, the system and method described herein may achieve desired part quality while reducing the total amount of support material utilized in the build process (e.g., relative to known methods).

The build part described herein refers to both a virtual object that is designed to be additively manufactured as well as a physical object produced via an additive manufacturing build process. The position or positioning of a build part within the additive manufacturing instrument refers to the location and orientation of the build part relative to the instrument. For example, the location can represent a specific area of a build platform of the additive manufacturing instrument on which the build part is constructed layer by layer. Often, multiple build parts are constructed during a common build process, so the build parts are arranged at different locations along an upper surface of the build platform. The orientation of the build part generally refers to a rotation and/or tilt of the build part relative to the instrument (e.g., the platform thereof). For example, the build part may be oriented about a longitudinal axis, and the orientation can indicate a rotation of the build part about the longitudinal axis and/or a tilt or lean of the longitudinal axis relative to a vertical axis.

The surface quality described herein refers to a surface roughness, a porosity content of the wall defining the given surface, structural and/or compositional uniformity of the wall, and/or the like. Generally, higher quality surfaces of additively manufactured build parts have fewer pores, smaller pores, and are smoother (e.g., less rough) than lower quality surfaces. One or more of the embodiments described herein are configured to produce build parts that have desirable and/or satisfactory surface and sub-surface quality and dimensional accuracy to reduce the scrap rate, reduce the amount of support material utilized, and reduce the amount of surface finishing during post-processing after the build process.

FIG. 1 is a schematic illustration of an additive manufacturing system 100 according to an embodiment. The additive manufacturing (AM) system 100 includes an additive manufacturing (AM) instrument 101 and a control unit 108. The AM instrument 101 includes a build platform (or plate) 102, an enclosure 104, an electromagnetic energy source 106, and a source material applicator 117. Optionally, the AM instrument 101 also includes an input device 134 and a display device 136. The platform 102 is a planar surface of the of the AM instrument 101 and may be represented by a plate, a lower wall of the enclosure 104, or the like. The AM instrument 101 performs additive manufacturing build processes to form three-dimensional build parts 116. Each build part 116 is built up from an upper surface 110 of the platform 102 by selectively depositing a source material 111 in consecutive layers 114 and fusing the source material 111 at designated locations according to a build plan 132. Each layer 114 is relatively thin, such as no greater than 1 mm, no greater than 0.5 mm, no greater than 0.25 mm, or the like.

The AM system 100 in FIG. 1 can be utilized to perform powder bed fusion additive manufacturing techniques. Suitable additive manufacturing processes can include, for example, vat photopolymerization (e.g., stereolithography, digital light processing, continuous digital light processing, light emission diode, and/or the like), powder bed fusion (e.g., binder jetting, selective laser melting, and the like), material jetting (e.g., material jetting, nanoparticle jetting, drop on demand, and the like), and multi jet fusion. At least most of these processes involve depositing a layer of material on a build surface and fusing selective portions of the material using a form of energy and/or polymer binding agent that scans the surface based on a CAD pattern. Other processes involve powder-feed or wire-feed directed energy deposition (DED), in which material is only deposited on the build part without depositing a wide layer on the build surface and selectively fusing material from the layer The source material 111 may be in powder form. In a non-limiting example, the powder includes one or more metals in the form of metal particles, flakes, or the like. The powder optionally can also include non-metallic filler materials intermixed with the metal material. The metal material may include various metal types, such as aluminum, stainless steel, copper, nickel, cobalt, titanium, or the like, and alloys of the various metal types. Possible non-metallic filler materials within the powder can include ceramics, polymers (e.g., plastics), silica, or the like. The powder that is deposited but is not fused to form part of the build part 116 defines a powder bed 122 of unused material 111 that is contained within walls 112 of the enclosure 104. In an embodiment, the part 116 is encased within the powder bed 122 during the build process. In an alternative embodiment, the source material 111 is free of metals.

The build part 116 is gradually formed or constructed by aggregating layers 114 in a build direction 124 along a build axis 126. With each successive addition of material 111 to the top of the part 116, the part 116 grows in the build direction 124. The build direction 124 extends away from the platform 102. In the illustrated embodiment, build axis 126 is orthogonal to a plane of the upper surface 110 of the platform 102.

The AM instrument 101 generates new layers of the part 116 by spreading a thin layer or stratum of the powder material 111 over the top of the part 116. For example, the source material applicator 117 of the AM instrument 101 deposits each layer 114 of material 111. The source material applicator 117 includes or represents a spreader or re-coater device that evenly spreads a thin layer of the material 111, an injector that injects the material 111, or the like. The material 111 can be stored in a reservoir prior to use. The source material application 117 is controlled by the control unit 108.

Then, the electromagnetic energy source 106 is controlled by the control unit 108 to emit focused electromagnetic energy towards the source material 111 in the top surface layer 114 to fuse designated portions of the material 111 to the build part 116, defining a new layer or fraction of the part 116. The focused electromagnetic energy can be in the form of a beam that impinges upon the stratum of the powder, causing a selected portion of the stratum to melt and adhere to the part 116 to form a new top portion thereof. For example the energy source 106 can be a laser device that generates high energy laser beams. In an embodiment, the electromagnetic energy source 106 is suspended above the top of the powder bed 122. For example, the electromagnetic energy source 106 may be disposed about 0.5 meters (m) above the upper surface 110 of the platform 102. The focused electromagnetic energy emitted from the energy source 106 may be aimed at or directed to different locations of the power bed 122 to fuse different selected portions of the top layer 114 to the part 116. The electromagnetic energy source 106 may include a scanning head that enables directing the beams to different locations within a designated coverage area without moving (e.g., displacing) the location of the electromagnetic energy source 106 relative to other components of the AM instrument 101. The orientation of the scanning head and parameters of the energy beams (e.g., timing, energy intensity, beam width, etc.) may be controlled by the control unit 108 via control signals. The process consecutively repeats according to instructions within the build plan 132 until the build part 116 is fully formed.

The AM instrument 101 may be controlled, according to the build plan 132, to form one or more external supports 120 during the build process for structurally supporting overhanging features of the build part 116. The one or more external supports 120 are additively formed during the same build process that forms the build part 116. For example, the build part 116 and the external supports 120 are both composed of a series of stacked material layers that are fused together during an additive manufacturing build process. Optionally, the internal structure (e.g., density, lattice, etc.) and/or material composition of the external supports 120 may be different than the build part 116. For example, the structure of the external support 120 may be less dense than the structure of the build part 116.

The control unit 108 represents hardware circuitry that includes and/or is connected with one or more processors 118 (e.g., one or more microprocessors, integrated circuits, microcontrollers, field programmable gate arrays, etc.) that perform operations described in connection with the control unit 108. The one or more processors 118 may operate based on programmed instructions. The one or more processors 118 may include a single processor or multiple processors that operate to perform the functions described herein. The one or more processors 118 are referred to herein in the plural form "processors" without limiting the scope to require multiple processors 118. The control unit 108 also includes a tangible and non-transitory computer-readable storage medium (e.g., memory) 130. The memory 130 may store the programmed instructions (i.e., software) that dictate the operations of the processors 118. For example, the memory 130 stores the build plan 132 associated with the build part 116 that is being fabricated.

The memory 130 may also store a part design file 138 of the build part 116. The part design file 138 may be a computer-aided design (CAD) file or another data file that describes the physical characteristics of the part 116, such as the shape, size, and/or composition of the part 116. The build plan 132 may be generated based on the part design file 138. For example, the build plan 132 may be a data file that dictates parameters, conditions, settings, and/or operations of the AM instrument 101 in order to produce a physical build part 116 which is a replica or match of the virtual part defined by the design file 138. One or more parameters or settings dictated by the build plan 132 may include a positioning of the build part 116 on the platform 102, a sequence of actions taken by the AM instrument 101 to build the part 116 (e.g., a path for the focused energy beam), the locations of supports 120, and the like. The sequence of actions to be taken by the AM instrument 101, as designated in the build plan 132, can include a designated scan path along which a scanning head of the beam emitter 106 is to direct focused energy beams. Additional parameters specified in the build plan 132 may include settings of the focused electromagnetic energy (e.g., power, timing, beam width, etc.), offsets, layer thicknesses, gas flow parameters, and the like. The control unit 108 (e.g., the processors 118 thereof) controls the operations of the electromagnetic energy source 106, the source material applicator 117, and/or other components based on the build plan 132 to produce the build part 116.

In the illustrated embodiment, the input device 134 and the display device 136 are communicatively connected to the processors 118 of the control unit 108. The input device 134 may include a touchpad, a touchscreen, a keyboard, a mouse, physical buttons, a joystick, or the like. The input device 134 enables an operator to provide commands to the AM system 100. In a non-limiting example, the operator can use the input device 134 to select and/or modify a candidate position of the build part 116 on the platform 102, to initiate the build process, to select and/or adjust additional settings and parameters of the AM instrument 101, and the like. The display device 136 includes a display screen that is configured to display information to the operator, such as to enable the operator to select specific settings. Optionally, the input and display devices 134, 136 may be integrated together within a unitary device, such as a laptop computer, a desktop computer, a workstation, a tablet computer, a mobile, hand-held computing device (e.g., smartphone), or the like. The processors 118 may be operably connected to the input device 134 and/or the display device 136 via a wired or wireless communication pathway.

In one embodiment, the processors 118 of the control unit 108 are configured to generate the build plan 132. For example, the processors 118 may access the part design file 138 that is stored in the memory 130. The processors 118 may receive user inputs selecting a desired position of the build part 116 on the platform 102. The one or more embodiments described herein may assist in the selection of the desired position of the build part 116 that enables the reduction or complete elimination of support material when forming the build part 116. The processors 118 may generate the build plan 132 based on the design of the part 116 and the position of the part 116. The build plan 132 may outline a sequence of actions of the AM instrument 101 to build the part 116 to have the designated design and at the desired location and orientation relative to the platform 102. The design file 138 of the design can be received from a remote computing device or generated locally via operator inputs on the input device 134. In an alternative embodiment, the processors 118 do not generate the build plan 132, but rather implement instructions that are generated remote from the AM instrument 101. For example, machine instructions may be processed externally by a computer or processing unit and transferred to the AM instrument 101 to be performed by the AM instrument 101

Typically, the determination of where to form supports, such as the supports 120, on a build part during an additive manufacturing process is based exclusively, or almost exclusively, on the angle of a designated segment of the build part relative to horizontal. The upper surface 110 of the platform 102 represents a horizontal plane. For example, during the generation of the build plan 132, a predefined angle relative to the horizontal may be utilized as a threshold. For example, the predefined angle may be 45 degrees. For all segments of the build part determined to define angles less than the threshold angle (e.g., 45 degrees) relative to horizontal, the conventional processes determine that supports are required underneath those segments. Inversely, supports are determined to not be necessary for segments that define angles relative to horizontal greater than the threshold angle. Although the description above refers to angles relative to horizontal, it is recognized that the same result can be achieved using the angles of the different segments of the build part relative to vertical (e.g., the build axis 126), instead of the horizontal because the vertical is orthogonal to the horizontal.

The approach for determining support locations based on the angle of the part segment relative to the horizontal (or vertical) is generalized and may result in the formation of a greater number or amount of supports than necessary to achieve the desired results regarding part shape accuracy, surface quality, and production efficiency (e.g., speed). Furthermore, the approach may degrade the surface quality of some segments by not locating supports under one or more segments that would benefit from having the support structures. The embodiments described herein consider additional geometrical characteristics of the build part that affect surface quality and material adhesion besides merely the angle of the part relative to horizontal, such as the angle of incidence of the segment relative to the electromagnetic energy source. The embodiments herein may more precisely determine support locations for an additive build part than conventional processes of determining where to locate supports. One or more technical effects of the embodiments described herein may reduce the total amount of support material utilized, which can increase the speed of production and significantly reduce the cost and time of post-processing to remove support structures from the build part. Another technical effect of the embodiments described herein may increase the part surface quality, such as by reducing the surface roughness and/or the number of defects.

Figure 2:
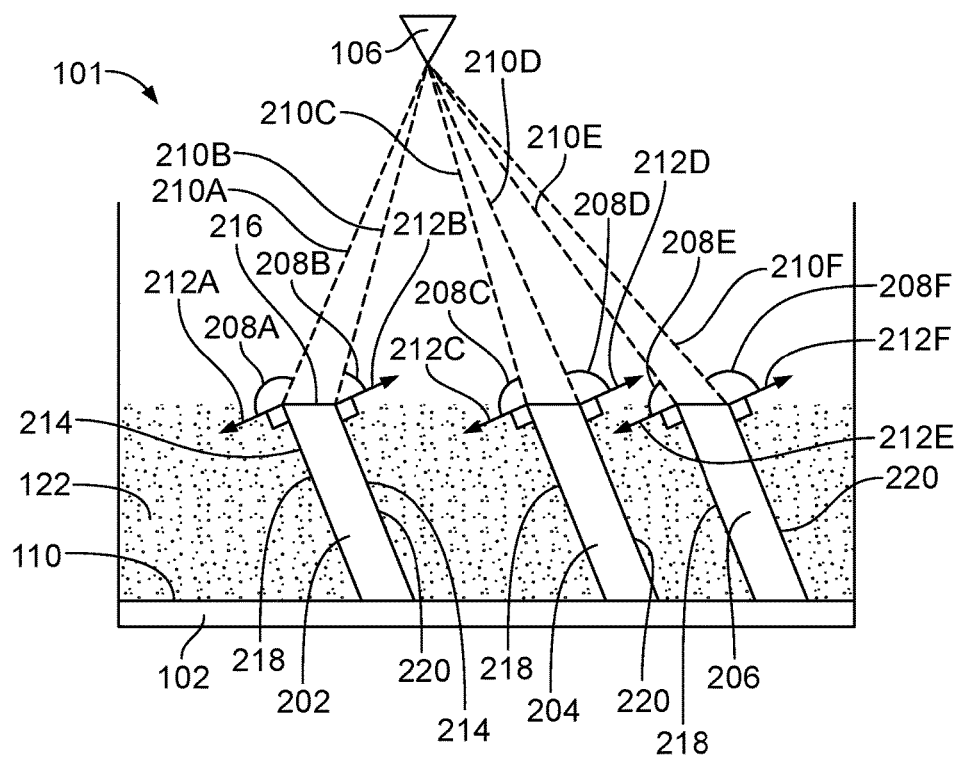
FIG. 2 illustrates a schematic diagram of an additive manufacturing instrument of the additive manufacturing system according to an embodiment.

FIG. 2 illustrates a schematic diagram of the AM instrument 101 forming three coupons 202, 204, 206 without the use of supports. The coupons 202, 204, 206 are discrete and spaced apart from one another, but may be representative of different segments of a single build part, such as the part 116 shown in FIG. 1, that will subsequently conjoin during the build process. The term coupon is used herein in a general, non-limiting sense to represent additively manufactured build parts and/or structures either unfinished during the build process or completed. In the illustrated embodiment, the coupons 202, 204, 206 have the same size, shape, and orientation relative to the platform 102. Furthermore, the coupons 202, 204, 206 are formed using the same materials and the same parameters of the energy source 106. The coupons 202, 204, 206 are encased within a powder bed 122. The only differences between the coupons 202, 204, 206 are in the positioning of the coupons 202, 204, 206 relative to the AM instrument 101 (e.g., the energy source 106 and the platform 102).

The positioning of the coupons 202, 204, 206 can refer to the location and orientation of the coupons 202, 204, 206 relative to the energy source 106. More specifically, the positioning can refer to the location and orientation of each of multiple different segments or layers of the coupons 202, 204, 206 relative to the energy source 106. The positioning can be characterized by the angle of incidence of individual segments of the coupons 202, 204, 206 relative to the energy source 106.

The angle of incidence 208 is the angle between a beam line 210 and a line 212 normal to (e.g., a surface normal vector of) the skin 214 (e.g., side surface) of the respective segment proximate to the beam line 210 point of intersection with the segment. The beam line 210 represents the path of a laser beam or other focused energy beam that is emitted or would be emitted from the energy source 106 to a surface layer 216 (e.g., top layer) of the respective coupon segment to generate the surface layer 216. The surface layer 216 is the most-recently formed layer at a given time that is at the top (e.g., end) of the layer stack. The skin 214 represents the side surface (e.g., edge) of one or more layers of the respective coupon immediately below the surface layer 216 and proximate to the beam line 210. The line or vector 212 is perpendicular to the skin 214. If the skin 214 is curved (e.g., non-planar), the line 212 can be normal to a tangent of the curved skin 214 at a location just below the surface layer 216. The build parts are three-dimensional, so the lines 212 of different skin segments of the same or different parts can have different vertical, lateral, and/or longitudinal or depth components relative to the energy source 106. The angle of incidence 208 as described herein is based on the positioning (e.g., location and orientation) of a given segment of a build part relative to the energy source 106. For example, the surface normal 212 is affected by the orientation of the skin 214, and the beam line 210 is affected by the location of the segment (e.g., the skin 214) relative to the energy source 106.

The one or more geometrical characteristics optionally also include an orientation of different respective segments (or skins 214) of the coupons 202, 204, 206 relative to horizontal. The orientation of each skin 214 can refer to a tilt angle defined between the skin 214 (or a tangent line extending from a curved skin 214) and the upper surface 110 of the platform 102 on which the coupons 202, 204, 206 are constructed. The three coupons 202, 204, 206 in FIG. 2 have the same sizes and shapes and the same orientations relative to the platform 102. The first, second, and third coupons 202, 204, 206 are overhanging objects in the illustrated embodiment. The coupons 202, 204, 206 each include a respective downskin 218 that faces generally towards the platform 102 and an upskin 220 that is opposite the downskin 218. The upskins 220 generally face upward away from the platform 102. The downskins 218 of the first, second, and third coupons 202, 204, 206 all have the same orientations relative to the platform 102 in FIG. 2. The upskins 220 of the coupons 202, 204, 206 also have the same orientations relative to the platform 102.

The three coupons 202, 204, 206 have different positions relative to the energy source 106, which are indicated by different angles of incidence 208. For example, the first coupon 202 defines a first angle of incidence 208A between the line 212A normal to the respective downskin 218 and a first beam line 210A. The first coupon 202 defines a second angle of incidence 208B between the line 212B normal to the respective upskin 220 and a second beam line 210B. The second coupon 204 defines a third angle of incidence 208C between the line 212C normal to the respective downskin 218 and a third beam line 210C. The second coupon 204 defines a fourth angle of incidence 208D between the line 212D normal to the respective upskin 220 and a fourth beam line 210D. The third coupon 206 defines a fifth angle of incidence 208E between the line 212E normal to the respective downskin 218 and a fifth beam line 210E. The third coupon 206 defines a sixth angle of incidence 208F between the line 212F normal to the respective upskin 220 and a sixth beam line 210F. In the illustrated embodiment, the first, third, and sixth angles of incidence 208A, 208C, 208F are obtuse (e.g., greater than 90 degrees). The skins 214 associated with obtuse angles of incidence are referred to herein as outskins for reasons provided below. The second and fifth angles of incidence 208B, 208E are acute (e.g., less than 90 degrees). The skins 214 associated with acute angles of incidence are referred to herein as inskins. The fourth angle of incidence 208D is a right angle (e.g., 90 degrees). Skins 214 associated with right angles of incidence represent an inflection or tipping zone between outskins and inskins.

Experimental testing has demonstrated that the angle of incidence 208 between the beam line 210 and the line 212 normal to the skin 214 can significantly impact the formation of the build part, such as the surface quality, near-surface quality (e.g., porosity), and dimensional accuracy. For example, in an experimental setup similar to that shown in FIG. 2, it was determined that outskins, in which the angle of incidence 208 is greater than a designated threshold angle, have significantly worse properties (e.g., surface and near-surface quality, porosity, and dimensional accuracy) than inskins, in which the angle of incidence 208 is less than the designated threshold angle, even though all test parameters were the same. The designated threshold angle may be an angle defined from 70 degrees to 110 degrees, such as 70 degrees, 80 degrees, 90 degrees, 100 degrees, or the like. More specifically, the threshold angle can be an angle between 80 degrees and 100 degrees. In a non-limiting embodiment, the designated threshold angle is 90 degrees. When the designated threshold angle is 90 degrees, obtuse angles of incidence are classified as outskin, and acute angles of incidence are classified as inskin. The outskins shown in FIG. 2 include the downskin 218 of the first coupon 202, the downskin 218 of the second coupon 204, and the upskin 220 of the third coupon 206. The inskins shown in FIG. 2 include the upskin 220 of the first coupon 202 and the downskin 218 of the third coupon 206. These results indicate that some downskin surfaces 218 can be inskins (e.g., the downskin 218 of the third coupon 206) and other downskin surfaces 218 can be outskins (e.g., the downskins 218 of the first and second coupons 202, 204), which have degraded properties relative to the inskins. Similarly, some upskin surfaces 220 can be inskins (e.g., the upskin 220 of the first coupon 202) and other upskin surfaces 220 can be outskins (e.g., the upskin 220 of the third coupon 206).

A potential explanation for this phenomenon is different local absorption of the focused beam energy due to different incident angles of the laser beam relative to the proximal part geometry, as suggested in S. Kleszczynski, A. Ladewig, K. Friedberger, J. zur Jacobsmühlen, D. Merhof, and G. Witt (2015). Position Dependency of Surface Roughness in Parts from Laser Beam Melting Systems. 26th International Solid Free Form Fabrication (SFF) Symposium, USA, pp 360-370, which is incorporated by reference herein in its entirety. For example, when forming a surface layer 216 along or proximate to an outskin surface (e.g., which defines an angle of incidence 208 greater than 90 degrees), some of the energy of the focused beam may be absorbed into the underlying powder within the powder bed 122, which affects the melt pool.

Figure 3:
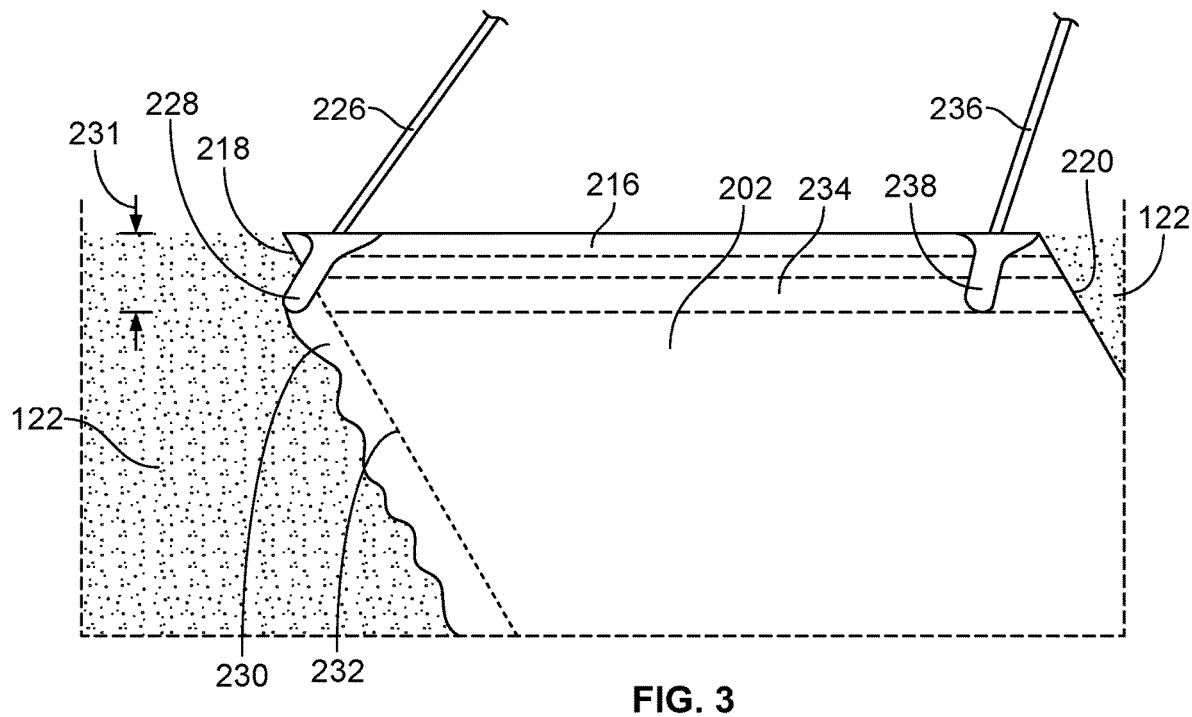
FIG. 3 illustrates a close-up portion of a first coupon shown in FIG. 2.

FIG. 3 illustrates a close-up portion of the first coupon 202 shown in FIG. 2. A laser beam 226 impinges upon the surface layer 216 proximate to the downskin 218 of the coupon 202. Because the angle of incidence 208A between the laser beam 226 and the line 212A normal to the downskin 218 is greater than 90 degrees, as shown in FIG. 2, the downskin 218 is classified as an outskin. The high energy laser beam 226 melts the source material, causing a melt pool 228. The shape of the melt pool 228 may not accurately accommodate for the part dimension, at least along areas proximate to the outskin. For example, the melt pool 228 in FIG. 3 penetrates a depth 231 that extends beyond the desired downskin edge 232 of the coupon 202, such that the energy of the beam 226 blows out into the powder bed 122. The energy absorbed by the powder can cause additional, undesired material, referred to herein as melt extensions 230, to form along the downskin surface 218 as the material cools and solidifies. The melt extensions 230 can increase surface roughness (e.g., reduce surface quality), porosity, and dimensional inaccuracy, relative to forming the coupons without melt extensions. The dimensional inaccuracy refers to the increased thickness or lateral width of the downskin 218 relative to the thickness/lateral width defined by the desired downskin edge 232. It is noted that the top-most layer or layers, including the surface layer 216, may be dimensionally accurate, at least at the current time during the build process. The laser penetration causes the previously-formed layers below the top-most layer or layers to grow. In FIG. 3, for example, the melt pool 228 causes melt extensions 230 to grow along the layer 234 that is two layers below the surface layer 216. The melt extensions 230 aggregate during the additive build process as additional layers of material are formed.

With continued reference to FIG. 2, the angle of incidence 208B at the upskin 220 of the first coupon 202 is quite different from the angle of incidence 208A at the downskin 218 of the first coupon 202. The angle of incidence 208B is acute, indicating that the upskin 220 of the first coupon 202 represents an inskin. Inskins are associated with improved quality characteristics, such as surface quality, near-surface quality, porosity, and dimensional accuracy, relative to outskins. The variation in quality may be attributable to the geometry of the build part underlying the newly-deposited surface layer 216. For example, energy from a laser beam 236 that is directed along the beam line 210B shown in FIG. 2 may be absorbed by the partially solidified or consolidated underlying material of the first coupon 202, resulting in less energy directed beyond the upskin 220 boundary and into the powder bed 122 (compared to the downskin 218). The melt pool 238 formed by the laser beam 236 may not penetrate through the upskin 220 boundary due to the angle of the beam 236 relative to the geometry of the coupon 202. For example, the melt pool 238 extends at least partially inward towards a lateral center of the coupon 202. Essentially, there is more of the partially solidified underlying material of the coupon 202 present to absorb the energy of the beam 236 than the amount of underlying material present to absorb the energy of the beam 226. As a result, there is less heating of the powder bed 122 along the upskin 220 than the amount of heating of the powder bed 122 along the downskin 218. Fewer melt extensions and other non-uniformities form along the upskin surface 220, which improves the surface quality and near-surface quality, the dimensional accuracy, and the porosity relative to the downskin 218.

As shown in FIG. 2, the angle of incidence 208D at the upskin 220 of the second coupon 204 is a right angle, which indicates that the beam line 210D is collinear with the angle of the upskin 220 just below the layer of material being deposited or most recently deposited. The upskin 220 of the second coupon 204 may be within a tipping zone or inflection zone between the inskins and the outskins. For example, the inflection zone can represent a range of angles that is between the inskins and outskins. The system disclosed herein may treat inflection zone skins differently than the inskins and outskins. The inflection zone can be a range centered at an inflection point, such as, but not limited to, 90 degrees. For example, the inflection zone can be between 70 degrees and 110 degrees, 80 degrees and 100 degrees, or the like.

Figure 4:
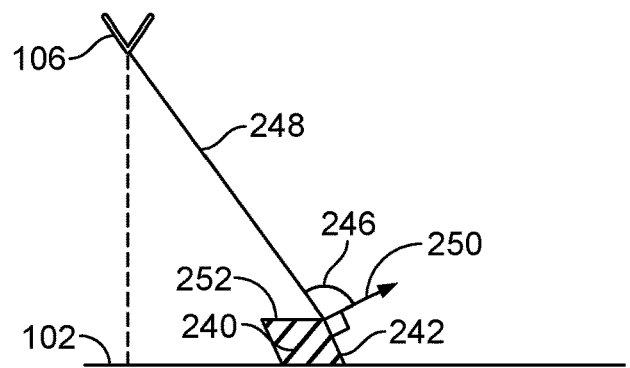
FIG. 4 illustrates a schematic diagram of the additive manufacturing instrument during a first stage in the construction of a single coupon according to an embodiment of the present disclosure.
Figure 5:
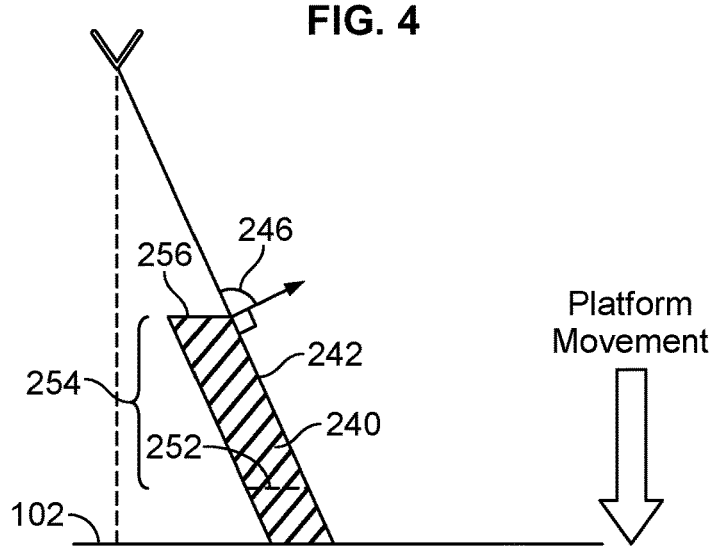
FIG. 5 illustrates a schematic diagram of the additive manufacturing instrument during a second stage in the construction of the coupon shown in FIG. 4.
Figure 6:
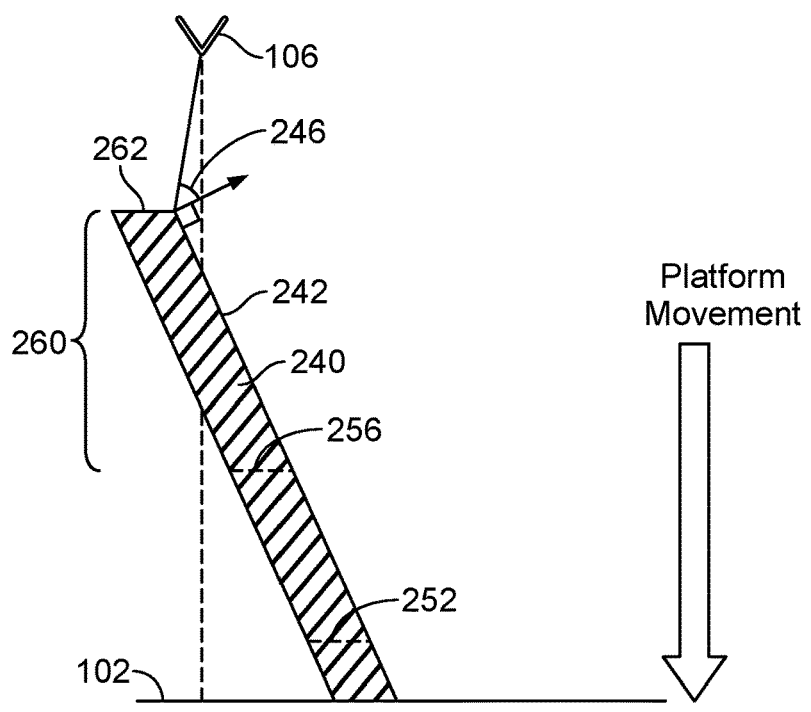
FIG. 6 illustrates a schematic diagram of the additive manufacturing instrument during a third stage in the construction of the coupon shown in FIGS. 4 and 5.

During the additive manufacturing process in which layers of material are consecutively deposited in a stack according to a designated build part geometry, the angle of incidence of a given skin of the build part relative to the beam emitter can change over time. For example, FIGS. 4-6 illustrate three different stages in the construction of a single coupon 240 over time by the AM instrument 101 according to an embodiment. The stages are chronological, such that the stage shown in FIG. 4 is prior to the stages shown in FIGS. 5 and 6, and the stage shown in FIG. 5 is before the stage shown in FIG. 6. FIGS. 4-6 show the effects of a part being built with a platform 102 that gradually drops (e.g., moves away from the energy source 106) as additional layers of material are deposited. The energy source 106 is disposed in the same position at each of the three illustrated stages of the build process, such that the energy source 106 is not moved. The coupon 240 that represents the build part in FIGS. 4-6 has a rhomboid shape with parallel, linear upskin 242 and downskin 244 surfaces.

The angle of incidence 246 at the upskin 242 relative to the energy source 106 changes over time as the coupon 240 is constructed. As described above, the relevant angle of incidence 246 is defined between a beam line 248 from the energy source 106 and the line 250 normal to the portion of the upskin 242 proximate to the current surface layer 252 of the coupon 240. In FIG. 4, the angle of incidence 246 is an obtuse angle (e.g., greater than 90 degrees), which indicates that the upskin 242 has an outskin classification. The segment of the coupon 240 formed at or proximate to the upskin 242 may have a degraded quality and/or accuracy that requires additional finishing steps post-build to increase the smoothness and/or provide proper dimensional alignment.

FIG. 5 shows that the platform 102 has moved and an additional portion 254 of the coupon 240 has been formed subsequent to the stage shown in FIG. 4. The additional portion 254 extends from the previous surface layer 252 to a current surface layer 256. In the illustrated stage, the angle of incidence 246 based on the upskin 242 is a right angle, which indicates that the upskin 242 is at the tipping or inflection zone between the outskin and inskin classifications. The segment of the coupon 240 formed at or proximate to the upskin 242 at the surface layer 256 is expected to have better quality and/or accuracy than the upskin 242 at the previous surface layer 252 due to the difference in angle of incidence 246.

FIG. 6 shows that the platform 102 has moved farther away from the fixed energy source 106 than shown in FIG. 5, and an additional portion 260 of the coupon 240 has been formed subsequent to the stage shown in FIG. 5. The additional portion 260 extends from the previous surface layer 256 to a current surface layer 262. In the illustrated stage, the angle of incidence 246 based on the upskin 242 is an acute angle (e.g., less than 90 degrees), which indicates that the upskin 242 has an inskin classification. The segment of the coupon 240 formed at or proximate to the upskin 242 at the surface layer 262 is expected to have better quality and/or accuracy than the upskin 242 at the previous surface layers 256, 252 due to the angle of incidence 246 differences. FIGS. 4-6 show that, as the rhomboid coupon 240 grows taller and the positioning of the surface layer changes relative to the energy source 106, the upskin 242 transitions from representing an outskin to an inskin. The system disclosed herein evaluates the build part geometry at multiple segments (e.g., along the same layer and different layers) to determine the angle of incidence effects on the build part. Optionally, the build part geometry may be evaluated layer by layer for classification as either an outskin, an inskin, or an inflection zone between the outskin and the inskin.

The geometrical characteristics of the segments of the build parts are used to determine characteristics of supports that are required to satisfy designated quality standards of the build part (prior to post-processing). The characteristics of the supports include locations, if any, at which support materials are necessary, a type of support material, a size and/or shape of the support material, and/or the like. The type of support material may refer to selecting between different support materials that have different internal structures (e.g., lattice structures), different material compositions, different densities, and/or the like.

Figure 7:
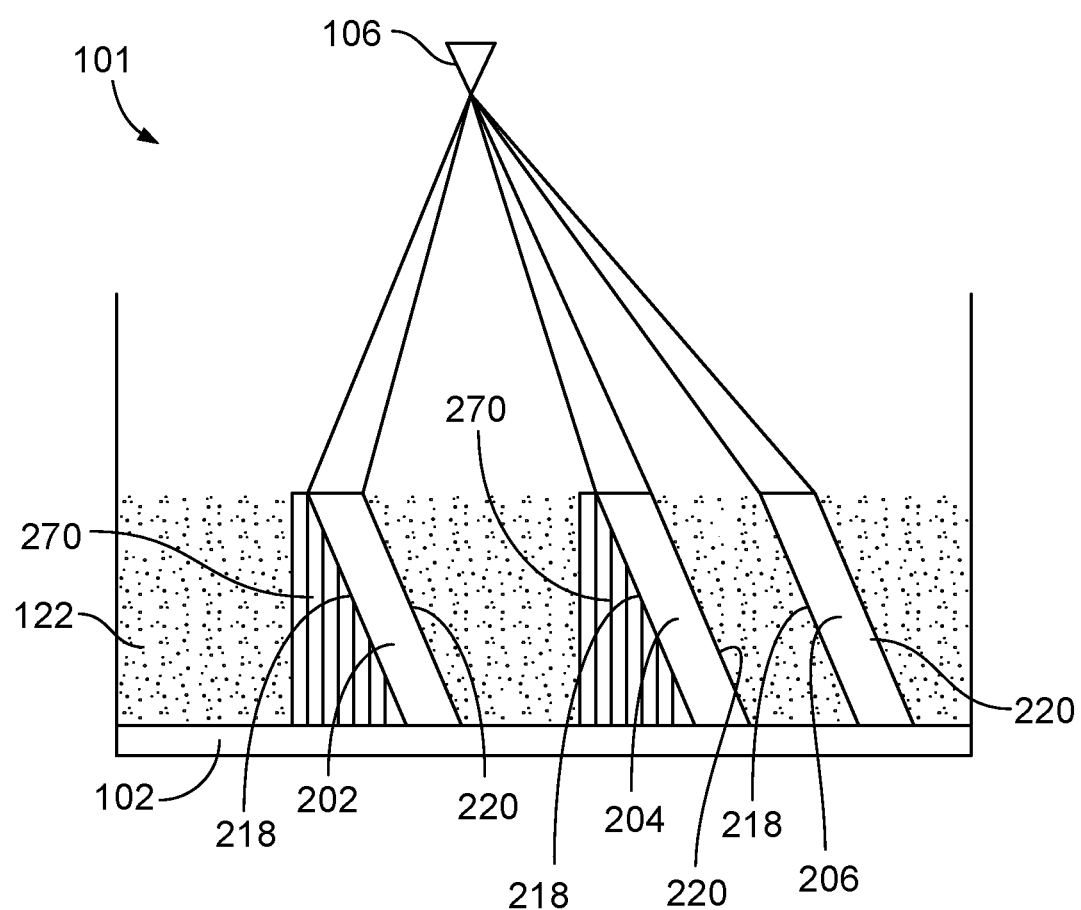
FIG. 7 illustrates three coupons shown in FIG. 2 that are constructed by the additive manufacturing instrument according to an embodiment of the present disclosure.

FIG. 7 illustrates the three coupons 202, 204, 206 shown in FIG. 2 that are constructed by the AM instrument 101 according to an embodiment. In at least one embodiment, the one or more processors are configured to determine the characteristics of which supports to use and where to use the supports based at least in part on a designated threshold angle of incidence. For example, in response to identifying one or more downskin surfaces (or skins) of the segments that have a determined angle of incidence greater than the designated threshold angle, the processors may determine that supports are necessary underneath the surfaces. The one or more processors may omit the use of supports along surfaces that have a determined angle of incidence less than the designated threshold angle. The designated threshold angle may be an angle that is greater than or equal to 0 degrees and less than or equal to 180 degrees, and more particularly an angle in a range between 60 degrees and 120 degrees, such as between 70 degrees and 110 degrees. In non-limiting examples, the designated threshold angle may be 70 degrees, 80 degrees, 90 degrees, 100 degrees, or the like (including other values in the stated ranges). In one embodiment, the designated threshold angle is 90 degrees. The processors may determine that surfaces which have angles of incidence greater than the designated threshold angle are to be formed with adjoining support material, and the surfaces with angles of incidence less than the designated threshold angle are to be formed without adjoining support material. Optionally, additional considerations may go into the determination of whether to use support material for a given surface besides the angle of incidence relative to the threshold angle. For example, if a given surface having an angle of incidence in excess of the threshold angle is an upskin surface, the processors may determine not to use support material for the upskin surface. Optionally, the surfaces that are characterized at the inflection zone (which have an angle of incidence at the designated threshold angle) may be formed without adjoining support material. Alternatively, the surfaces at the inflection zone may be formed with adjoining support material.

Using conventional methods, all or most of the downskins in FIG. 7 might receive support material. For example, because all three coupons 202, 204, 206 have the same angular orientation relative to the platform 102, if the support determination is based only on the angle relative to horizontal, then supports may be formed along the downskins 218 of all three coupons 202, 204, 206. In an embodiment of the additive manufacturing system, after the determination described above, the processors may not form support material on the third coupon 206. Furthermore, the downskin 218 of the second coupon 204 might require less support (e.g., a different type of structure and/or smaller size) than the downskin 218 of the first coupon 202. The analysis of geometrical characteristics indicates that the downskins 218 of the first and second coupons 202, 204, and the upskin 220 of the third coupon 206 are outskins for having angles of incidence greater than 90 degrees. The presence of the supports 270 underneath the first and second coupons 202, 204 may improve the quality by supporting the outskins and prohibiting the formation of melt extensions and other non-uniformities attributable to the beam energy melting through to the powder bed 122. The support material, which is partially solidified, may be better able to absorb and/or reflect the focused beam energy from the energy source 106 without deteriorating the outskin surfaces than the powder bed 122. The angle of incidence of the downskin 218 of the second coupon 204 is less than that of the downskin 218 of the first coupon 202 (as shown in FIG. 2). For at least this reason, the processors may select different characteristics of support material for supporting the first and second coupons 202, 204. For example, the support for the second coupon 204 may be smaller, less dense, less strong, and/or the like than the support selected for the first coupon 202.

The geometrical characteristics of the part segments relative to the energy source 106 can be used to reduce the total amount of support material formed relative to known planning techniques. By considering the angles of incidence relative to the energy source 106 and the effects of angle of incidence on the part quality, the one or more processors in the illustrated embodiment determine that a support along the third coupon 206 is unnecessary and can be omitted. The upskin 220 of the third coupon 206, although characterized as an outskin, may not benefit from having support material that is applied subsequent to the upskin 220. The downskin 218 of the third coupon 206 is characterized as an inskin with an angle of incidence less than the designated threshold angle. Avoiding the formation of a support underneath the third coupon 206 desirably increases manufacturing speed, reduces costs (e.g., material and energy costs), and reduces post-processing tasks (to excise the supports).

In an embodiment, upon determining which segments of the coupons 202, 204, 206 require supports 270 to achieve a certain quality (e.g., surface quality, sub-surface quality, dimensional accuracy, and the like), the build plan 130 (shown in FIG. 1) may be generated or modified to include the support information, such as the locations and shapes of the supports 270.

In a non-limiting example, the processors 118 of the AM system 100 perform the following functions prior to the actual construction of an additively manufactured build part. Reference is made to FIG. 1. First, the processors 118 determine a candidate position of the build part. The candidate position may be received via an operator selection using the input device 134 or may be selected or determined by the processors 118 as one of multiple candidate positions to be evaluated. The candidate position refers to the location and orientation (e.g., rotation and tilt) of the build part relative to the AM instrument 101. The position of the energy source 106 relative to the candidate position is known by the processors 118.

Next, the processors 118 are configured to analyze the proposed design of the build part at the candidate position to determine geometrical characteristics of the build part in the candidate position. The build part may be virtually partitioned (e.g., tessellated) into a plurality of segments. The segments may have any size and shape. Each segment may have a height as short as the thickness of one layer, such that build part may be examined layer by layer. Optionally, each segment height may represent multiple layers of material. In an embodiment, the segments have a thickness or depth dimension, such that the segments include more material than the surface that is visible. For example, each segment may have a designated depth, such as 0.5 cm, 1.0 cm, or the like. Alternatively, the segments may lack a thickness or depth dimension, and only represent the surface of the build part. In a non-limiting example, the segments can be triangles that have heights which cross multiple layers. The processors 118 determine one or more geometrical characteristics for each of the segments of the build part.

The geometrical characteristics include the angle of incidence relative to the electromagnetic energy source 106. For example, a first segment defines a first angle of incidence relative to the energy source 106. The angle of incidence is defined between a beam line extending from the energy source 106 and a surface normal of the side surface (e.g., skin) of the first segment. The surface normal is a line extending perpendicularly from a plane of the side surface (e.g., skin) of the segment. The relevant plane of the side surface is the plane proximate to the impact point of the energy beam on the surface layer. The processors 118 determine a respective angle of incidence for each segment of the build part. Then, the processors 118 compare the angles of incidence to a designated threshold angle to classify the segments. In a non-limiting example, the designated threshold angle is 90 degrees, and segments that have acute angles of incidence are classified as inskin segments. Segments that have obtuse angles of incidence are classified as outskin segments.

The geometrical characteristics include the angle of incidence relative to the electromagnetic energy source 106. For example, a first segment defines a first angle of incidence relative to the energy source 106. The angle of incidence is defined between a beam line extending from the energy source 106 and a surface normal of the side surface (e.g., skin) of the first segment. The processors 118 determine a respective angle of incidence for each segment of the build part. Then, the processors 118 compare the angles of incidence to a designated threshold angle to classify the segments. In a non-limiting example, the designated threshold angle is 90 degrees, and segments that have acute angles of incidence are classified as inskin segments. Segments that have obtuse angles of incidence are classified as outskin segments.

In an embodiment, the processors 118 utilize the determined geometrical characteristics of the segments of the build part to determine where supports (e.g., block supports) would be needed if manufacturing the build part at the candidate position, in order to construct a build part that satisfies designated quality standards. With reference to the angle of incidence geometrical characteristic, segments that have angles of incidence (relative to the energy source) above a designated threshold angle are expected to have worse quality than surfaces having angles of incidence below the designated threshold angle. Thus, outskin surfaces are expected to have degraded accuracy, surface quality, and/or sub-surface quality relative to inskin surfaces. For example, outskin surfaces may be expected to have greater porosity and/or roughness than inskin surfaces.

In an embodiment, the processors 118 may input one or more of the geometrical characteristics as variables into one or more functions to provide, as an output, the calculated locations and other characteristics (e.g., internal structures, size, shape, etc.) of support material. The functions may incorporate and factor in multiple geometrical characteristics, such as the angle of incidence and the angle relative to horizontal of a given segment, as well as any designated threshold angles associated with the angle of incidence and/or angle relative to horizontal. Optionally, the one or more functions may include additional input variables that may affect the analysis, such as the type of powder or other source material, build parameters such as power, speed, beam diameter, beam pass separation, settings such as the direction the recoater arm moves in the AM instrument 101, the direction of gas flow through the AM instrument 101, and/or the like. The one or more functions may be based on simulations or predictive data modeling. In an embodiment, the functions can be derived from historical, experimental data that tests the effects of different support locations and amounts of support on the resulting quality of a given build part. For example, various experiments may be performed in which a multitude of test coupons are additively manufactured, where the only differences between the test coupons is the amount and/or locations of supports adjoining the test coupons and the positions of the test coupons relative to the energy source 106. By observing and recording the resulting surface quality, sub-surface quality, and/or geometrical accuracy of the different coupons, data that correlates the quality to the positioning and supports can be collected and stored in a database, such as a look-up table, mathematical model, or the like. The one or more functions may be derived based on this experimental data.

Optionally, the processors 118 may weight segments of the build part differently during the analysis of whether the segments require supports. For example, some segments of the build part may have higher quality standards than other segments. The weights may be applied by adjusting the designated threshold angle of incidence. For example, if a high surface quality is required for a first segment of the build part, such that melt extensions are to be avoided entirely, then the designated threshold angle of incidence may be reduced (e.g., to 70 degrees) such that the processors 118 are more likely to assign a block support to adjoin the first segment. Conversely, the designated threshold angle of incidence may be increased (e.g., to 110 degrees) for a second segment of the build part in which surface quality is not that important, which reduces the likelihood of the processors 118 assigning a block support to adjoin the second segment. Various constraints such as the desired quality standards can be input by the operator and/or stored in the part design file 138.

After determining where support material is needed at the candidate position of the build part to satisfy a standard quality for the build part, the processors 118 may store the support locations in the memory 130. Optionally, the processors 118 may generate a virtual representation of the build part at the candidate position showing block supports in the determined locations relative to the build part. The virtual representation may be a simulated image or computer model that is displayed on the display device 136 to enable viewing by the operator. The virtual representation may be displayed as two-dimensional or three-dimensional. In an example in which the virtual representation is three-dimensional, the virtual representation may be rotatable to view different selected sections of the build part and block supports. The processors 118 may provide additional information such as the total volume or mass of support material projected to be used when forming the build part at the candidate position. The virtual representation can be incorporated into a virtual reality platform and/or an augmented reality platform. The operator can view the virtual representation to visualize the locations and/or amount of supports needed at the candidate position.

Simulating the locations of supports enables the operator and/or the processors 118 of the AM system 100 to adjust the position of the build part relative to the AM instrument 101 for reducing the amount of supports used during the build process. The operator may utilize the input device 134 to input or select a second candidate position which has a different location on the platform 102, a different rotational orientation, and/or a different tilt angle than the (first)

candidate position. Upon receiving the second candidate position, the processors 118 may repeat the process described above to determine the locations of block supports that would be required when forming the build part at the second candidate position. Optionally, a second virtual representation of the build part may be generated and displayed that shows the build part at the second candidate position and any supports that are determined to be needed to achieve a designated quality standard. The second virtual representation may be concurrently displayed or, alternatively, consecutively displayed with the first virtual representation to enable the operator to compare the two projected results. The processors 118 may store the details of the second candidate position, the locations of the supports, the geometrical characteristics, and the like, in the memory 130 and/or in another storage device.

The AM system 101 described herein allows for manual optimization of the build part positioning relative to the AM instrument 101. For example, based on a comparison between the information provided by the first and second virtual representations, the operator may select one or more additional candidate positions. At each additional candidate position, the processors 118 are configured to repeat the analysis to generate a new projection of the amount and locations of supports to be used during the build process. The operator can keep modifying the candidate positions until a candidate position is discovered that results in the least amount of supports (e.g., support material) utilized relative to constructing the build part at the other candidate positions.

The AM system 101 may provide automated optimization of the build part positioning relative to the AM instrument 101. For example, the processors 118 may generate a recommended position for the build part based on an analysis of the build part at multiple candidate positions without utilizing operator input. The processors 118 may perform the analysis on an initial set of candidate positions to determine the total number of supports and/or total amount of supports that would be utilized for each of the candidate positions in the initial set. Then the processors 118 can select one or more preferred candidate positions from the initial set that have better results (e.g., less overall support material utilization) than other candidate positions. Optionally, the processors 118 may generate additional candidate positions based on the results of the initial analyses, and at least some of the preferred candidate positions may be generated by the processors 118. The processors 118 may select the best preferred candidate position as a recommended position to use during the actual build process. Alternatively, the processors 118 may present the preferred candidate positions to the operator, such as the top three candidate positions, to enable the operator to decide which of the preferred candidate positions to select for the build process.

The operator may utilize the input device 134 to select or confirm a final selected position of the build part. The selected position can be a preferred position generated by the processors 118 or a position selected by the operator based on the virtual representations displayed on the display device 136 and/or other information presented by the system to the operator. Once the position of the build part relative to the instrument 101 is finalized, the processors 118 can generate or update the build plan 132 (shown in FIG. 1) based on the final selected position of the build part and the determined locations of block supports. Then, the AM instrument 101 can be controlled to additively manufacture a physical build part according to the build plan 132, such that the build part is constructed in a location and orientation that matches the final selected position.

Figure 8:
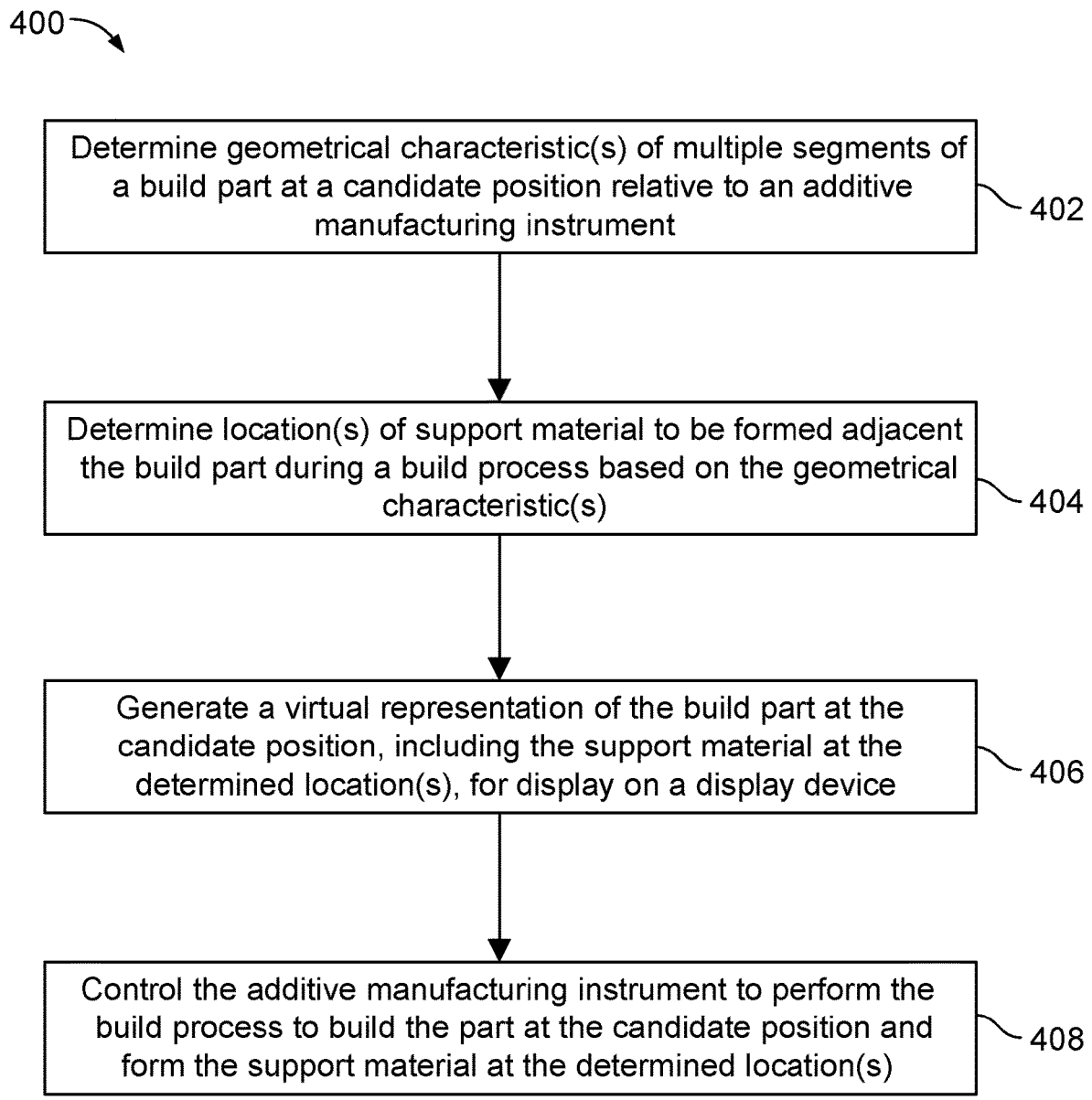
FIG. 8 is a flow chart of a method of determining part support locations for additively manufacturing a build part according to an embodiment of the present disclosure.

FIG. 8 is flow chart of a method 400 of determining part support locations for additively manufacturing a build part according to an embodiment of the present disclosure. The method 400 is configured to more precisely determine where supports should be located than at least some known techniques, which may enable reducing the amount of support material utilized without sacrificing surface quality of the build part. The method 400 may be performed in whole, or at least in part, by the one or more processors 118 of the control unit 108 of the AM system 100 shown in FIG. 1. Optionally, some operator input can be provided in one or more of the steps. Optionally, the method 400 may include more steps than shown in FIG. 8, fewer steps than shown in FIG. 8, different steps that are not shown in FIG. 8, and/or a different arrangement of the steps than shown in FIG. 8.

The method 400 begins at 402, at which one or more geometrical characteristics of each of multiple segments of a build part are determined at a candidate position of the build part relative to an additive manufacturing instrument. The one or more geometrical characteristics include an angle of incidence between a beam line extending from an electromagnetic energy source of the additive manufacturing instrument and a surface normal of a respective skin of the corresponding segment proximate to the beam line. Optionally, the one or more geometrical characteristics may also include an angle of the respective skin of the corresponding segment relative to an upper surface of a platform of the additive manufacturing instrument.

At 404, one or more locations are determined for support material to be formed adjacent the build part during a build process of the build part. The one or more support locations are determined based on the one or more geometrical characteristics of the segments at the candidate position. The one or more support locations are determined by identifying the segments of the build part that require adjacent support material. Such segments may be identified, at least in part, as the segments that have respective angles of incidence greater than a designated threshold angle. Conversely, the one or more support locations may be determined by identifying the segments of the build part that do not require adjacent support material, which may include, in part, segments with respective angles of incidence less than the designated threshold angle.

Optionally, at 406, a virtual representation of the build part at the candidate position is generated for display on a display device. The virtual representation includes the support material at the one or more locations that are determined. At 408, the additive manufacturing instrument is controlled to perform the build process. The build process includes forming the build part at the candidate position and forming the support material at the one or more locations that are determined.

Optionally, the method repeats for different candidate positions of the build part relative to the additive manufacturing instrument. For example, the one or more geometrical characteristics of each of the segments of the build part are determined at additional candidate positions of the build part relative to the instrument. Then, the one or more locations of support material to be formed adjacent the build part are determined for each of the respective additional candidate positions based on the corresponding one or more geometrical characteristics. Afterwards, one or more preferred positions of the build part are selected from among the candidate position and the additional candidate positions based on a total number of locations of the support material and/or a total amount of the support material. For example, the preferred positions may have less total support material required than the candidate positions that are not selected as preferred positions. The additive manufacturing instrument may be controlled to perform the build process at 408 to form the build part at one of the preferred positions.

One or more embodiments described herein use information about the shape of the build part to determine characteristics of support materials that should be utilized during the build process. The support material characteristics can include the locations of the supports, as well as the internal structure, size, shape, density, and/or the like of the supports. Utilizing factors such as angle of incidence relative to an energy source and angle from horizontal allow for generating robust parameters that (i) reduce the total amount of supporting material on the build part and/or (ii) produce a build part with surfaces that satisfy a designated surface quality standard. The new parameters generated may allow more overhang of features and the generation of more complex parts by capitalizing on angle of incident effects. Furthermore, the new parameters may enable reorienting a build part relative to the energy source axis and/or the upper surface of the platform to reduce the amount of supports without sacrificing surface quality of the resulting build part.

While various spatial and directional terms, such as top, bottom, lower, mid, lateral, horizontal, vertical, front and the like are used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

The diagrams of embodiments herein illustrate one or more control or processing units, such as the control unit 108 shown in FIG. 1. It is to be understood that the control or processing units represent circuits, circuitry, or portions thereof that are implemented as hardware with associated instructions (e.g., software stored on a tangible and non-transitory computer readable storage medium, such as a computer hard drive, ROM, RAM, or the like) that perform the operations described herein. The hardware can include state machine circuitry hardwired to perform the functions described herein. The hardware can include electronic circuits that include and/or are connected to one or more logic-based devices, such as microprocessors, processors, controllers, or the like. Optionally, the control unit 108, or the one or more processors 118 thereof, represents processing circuitry such as one or more of a field programmable gate array (FPGA), application specific integrated circuit (ASIC), microprocessor(s), a quantum computing device, and/or the like. The circuits in various embodiments are configured to execute one or more algorithms to perform functions described herein. The one or more algorithms include aspects of embodiments disclosed herein, whether or not expressly identified in a flowchart or a method.

As used herein, the term "control unit," or the like includes any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only and are thus not intended to limit in any way the definition and/or meaning of such terms. The control unit 108 shown in FIG. 1 is configured to execute a set of instructions that are stored in one or more storage elements (such as one or more memories), in order to process data. The set of instructions includes various commands that instruct the control unit 108 (e.g., the processor(s) 118 thereof) as a processing machine to perform specific operations such as the methods and processes of the various embodiments of the subject matter described herein. In an embodiment, the set of instructions is in the form of a software program. The processing of input data by the processing machine is in response to user commands, in response to results of previous processing, or in response to a request made by another processing machine. As used herein, the term "software" includes any computer program stored in memory for execution by a computer, including but not limited to RAM memory, ROM memory, EPROM memory, EEPROM memory, and non-volatile RAM (NVRAM) memory.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are example embodiments. Many other embodiments will be apparent to those of ordinary skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those of ordinary skill in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An additive manufacturing system comprising:
one or more processors configured to determine one or more geometrical characteristics of each of multiple segments of a build part at a candidate position of the build part relative to an additive manufacturing instrument, wherein the one or more geometrical characteristics, for each corresponding segment of the segments, include an angle of incidence between (i) a beam line extending from an electromagnetic energy source of the additive manufacturing instrument to a surface layer of the build part at the corresponding segment and (ii) a surface normal vector of a respective skin of the corresponding segment proximate to the beam line, wherein the skin of the corresponding segment is a side surface of one or more layers of the build part immediately below the surface layer,
wherein the one or more processors are configured to determine, based at least on the one or more geometrical characteristics including the angles of incidence, one or more locations of support material to be formed adjacent the build part during a build process of the build part at the candidate position.

2. The additive manufacturing system of claim 1, wherein the one or more processors are configured to determine that the support material is to be located adjacent a first segment of the segments of the build part responsive to the angle of incidence of the first segment being greater than a designated threshold angle.

3. The additive manufacturing system of claim 2, wherein the designated threshold angle is within a range defined from 0 degrees to 180 degrees.

4. The additive manufacturing system of claim 2, wherein the designated threshold angle is within a range defined from 60 degrees to 120 degrees.

5. The additive manufacturing system of claim 2, wherein the designated threshold angle is within a range defined from 70 degrees to 110 degrees.

6. The additive manufacturing system of claim 2, wherein the designated threshold angle is 90 degrees.

7. The additive manufacturing system of claim 1, wherein the one or more processors are configured to determine that the support material is not to be located adjacent a first downskin segment of the segments of the build part responsive to the angle of incidence of the first downskin segment being less than a designated threshold angle.

8. The additive manufacturing system of claim 1, wherein the one or more geometrical characteristics of each of the segments also include an angle of the respective skin of the corresponding segment relative to an upper surface of a platform of the additive manufacturing instrument.

9. The additive manufacturing system of claim 8, wherein the one or more processors are configured to input the angle of incidence and the angle relative to the upper surface of each of the segments into a function that outputs whether to form the support material adjacent to the corresponding segment based on the respective angle of incidence and the respective angle relative to the upper surface .

10. The additive manufacturing system of claim 1, wherein the one or more processors are configured to generate or update a build plan for controlling the additive manufacturing instrument to additively manufacture the build part and the support material at the one or more locations that are determined.

11. The additive manufacturing system of claim 1, wherein, responsive to receiving an indication to initiate the build process with the build part at the candidate position, the one or more processors are configured to control the additive manufacturing instrument to additively manufacture the build part at the candidate position and to additively manufacture the support material at the one or more locations that are determined.

12. The additive manufacturing system of claim 1, wherein the one or more processors are configured to generate a virtual representation of the build part at the candidate position for display on a display device, the virtual representation including the support material at the one or more locations that are determined.

13. The additive manufacturing system of claim 1, wherein the one or more processors are configured to determine the one or more geometrical characteristics of each of the segments of the build part at additional candidate positions of the build part relative to the additive manufacturing instrument, and are configured to determine one or more locations of support material to be formed adjacent the build part during the build process for each of the respective additional candidate positions based on the corresponding one or more geometrical characteristics,
wherein the one or more processors are configured to select one or more selected positions of the build part from among the candidate position and the additional candidate positions based on one or more of a total number of locations of the support material or a total amount of the support material.

14. The additive manufacturing system of claim 13, wherein, responsive to receiving a selection of one of the one or more selected positions as a final position of the build part, the one or more processors are configured to control the additive manufacturing instrument to additively manufacture the build part at the final position and to additively manufacture the support material at the one or more locations corresponding to the final position.

15. A method comprising:
determining one or more geometrical characteristics of each of multiple segments of a build part at a candidate position of the build part relative to an additive manufacturing instrument, wherein the one or more geometrical characteristics, for each corresponding segment of the segments, include an angle of incidence between (i) a beam line extending from an electromagnetic energy source of the additive manufacturing instrument to a surface layer of the build part at the corresponding segment and (ii) a surface normal vector of a respective skin of the corresponding segment proximate to the beam line, wherein the skin of the corresponding segment is a side surface of one or more layers of the build part immediately below the surface layer; and
determining, based at least on the one or more geometrical characteristics including the angles of incidence, one or more locations of support material to be formed adjacent the build part during a build process of the build part at the candidate position.

16. The method of claim 15, further comprising controlling the additive manufacturing instrument to perform the build process, wherein the build process includes forming the build part at the candidate position and forming the support material at the one or more locations that are determined.

17. The method of claim 15, further comprising generating a virtual representation of the build part at the candidate position for display on a display device, the virtual representation including the support material at the one or more locations that are determined.

18. The method of claim 15, wherein determining the one or more locations of the support material includes identifying the segments of the build part that require adjacent support material, wherein the segments that require adjacent support material are identified as the segments that have respective angles of incidence greater than a designated threshold angle.

19. The method of claim 15, further comprising:
    determining the one or more geometrical characteristics of each of the segments of the build part at additional candidate positions of the build part relative to the additive manufacturing instrument;
    determining one or more locations of support material to be formed adjacent the build part during the build process for each of the respective additional candidate positions based on the corresponding one or more geometrical characteristics; and
    selecting one or more selected positions of the build part from among the candidate position and the additional candidate positions based on one or more of a total number of locations of the support material or a total amount of the support material.

20. An additive manufacturing system comprising:
    a display device; and
    one or more processors operably coupled to the display device, the one or more processors configured to determine one or more geometrical characteristics of each of multiple segments of a build part at a candidate position of the build part relative to an additive manufacturing instrument, wherein the one or more geometrical characteristics, for each corresponding segment of the segments, include an angle of incidence between (i) a beam line extending from an electromagnetic energy source of the additive manufacturing instrument to a surface layer of the build part at the corresponding segment and (ii) a surface normal vector of a respective skin of the corresponding segment proximate to the beam line, wherein the skin of the corresponding segment is a side surface of one or more layers of the build part immediately below the surface layer,
    wherein the one or more processors are configured to determine, based at least on the one or more geometrical characteristics including the angles of incidence, one or more locations of support material to be formed adjacent the build part during a build process of the build part at the candidate position, wherein the one or more processors are configured to generate and display a virtual representation of the build part at the candidate position on the display device, the virtual representation including the support material at the one or more locations that are determined.

* * * * *